(12) United States Patent
Paskalev et al.

(10) Patent No.: US 11,086,615 B2
(45) Date of Patent: Aug. 10, 2021

(54) VIRTUAL APPLIANCE UPGRADES IN HIGH-AVAILABILITY (HA) COMPUTING CLUSTERS

(71) Applicant: VMware, Inc., Palo Alto, CA (US)

(72) Inventors: Stanislav Paskalev, Sofia (BG); Viktor Kojouharov, Sofia (BG); Alexandar Bonev, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/959,487

(22) Filed: Apr. 23, 2018

(65) Prior Publication Data

US 2019/0324741 A1  Oct. 24, 2019

(51) Int. Cl.
| | |
|---|---|
| G06F 8/656 | (2018.01) |
| G06F 9/455 | (2018.01) |
| G06F 9/54 | (2006.01) |
| G06F 16/27 | (2019.01) |

(52) U.S. Cl.
CPC .......... *G06F 8/656* (2018.02); *G06F 9/45558* (2013.01); *G06F 9/547* (2013.01); *G06F 16/27* (2019.01); *G06F 2009/4557* (2013.01); *G06F 2009/45595* (2013.01)

(58) Field of Classification Search
CPC ..... G06F 8/60; G06F 8/61; G06F 8/62; G06F 8/65; G06F 8/656; G06F 8/71; G06F 9/45558; G06F 9/485; G06F 9/547; G06F 11/1433; G06F 16/27; H04L 67/16

USPC ........................................................ 717/169
See application file for complete search history.

(56) References Cited

U.S. PATENT DOCUMENTS

| | | | |
|---|---|---|---|
| 2015/0207695 A1* | 7/2015 | Varney et al. | .......... H04L 67/16 709/223 |
| 2016/0378348 A1* | 12/2016 | Uriel | ................... G06F 9/45558 711/114 |
| 2018/0067736 A1* | 3/2018 | De Zaeytijd et al. | .... G06F 8/65 |

* cited by examiner

*Primary Examiner* — Wei Y Zhen
*Assistant Examiner* — Mohammed N Huda
(74) *Attorney, Agent, or Firm* — Thomas Horstemeyer, LLP

(57) ABSTRACT

Various examples are disclosed for performing a software upgrade in high-availability (HA) and similar computing clusters while experiencing minimal or no downtime. One or more computing devices can oversee operation of a data center and determine that a software update is unable to be performed on a first virtual appliance based on the first virtual appliance being incompatible with the software update. The one or more computing devices can provision a second virtual appliance in the HA computing cluster, as well as a load balancer, where the second virtual appliance comprises up-to-date software. The one or more computing devices can form a software cluster that includes the first virtual appliance and the second virtual appliance, causing data to be synchronized between the first virtual appliance and the second virtual appliance, and, thereafter, can decommission the first virtual appliance from the HA computing cluster.

20 Claims, 5 Drawing Sheets

VIRTUAL APPLIANCE UPGRADES IN HIGH-AVAILABILITY (HA) COMPUTING CLUSTERS

BACKGROUND

Computer virtualization relates to the creation of a virtualized version of a physical device, such as a server, a storage device, a central processing unit (CPU), a graphics processing unit (GPU), or other computing resources. For instance, a virtual machine (VM) is an emulation of a computer system and can be customized to include, for example, a predefined amount of random access memory (RAM), hard drive storage space, as well as other computing resources that emulate a physical machine. As virtual machines resemble physical computer architectures, virtual machines can provide the equivalent functionality of a physical computer. As such, virtual machines can be executed remotely, in a data center for example, to provide remote desktop computer sessions for employees of an enterprise. Many enterprises have now moved away from offering purely physical desktops for personnel, instead utilizing virtual machines that provide virtual desktop sessions using remote resources.

A virtual appliance (VA) is a type of a virtual machine typically consisting of a pre-configured operating system (OS) environment and a single application. In data centers that provide virtualization services, the software executing on virtual appliances and other types of virtual machines must be updated from time-to-time, for instance, to provide new features or fix security vulnerabilities. However, some updates are unable to be performed on a virtual appliance due to incompatibilities between a new version of an application and a feature of the virtual appliance, such as the operating system.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
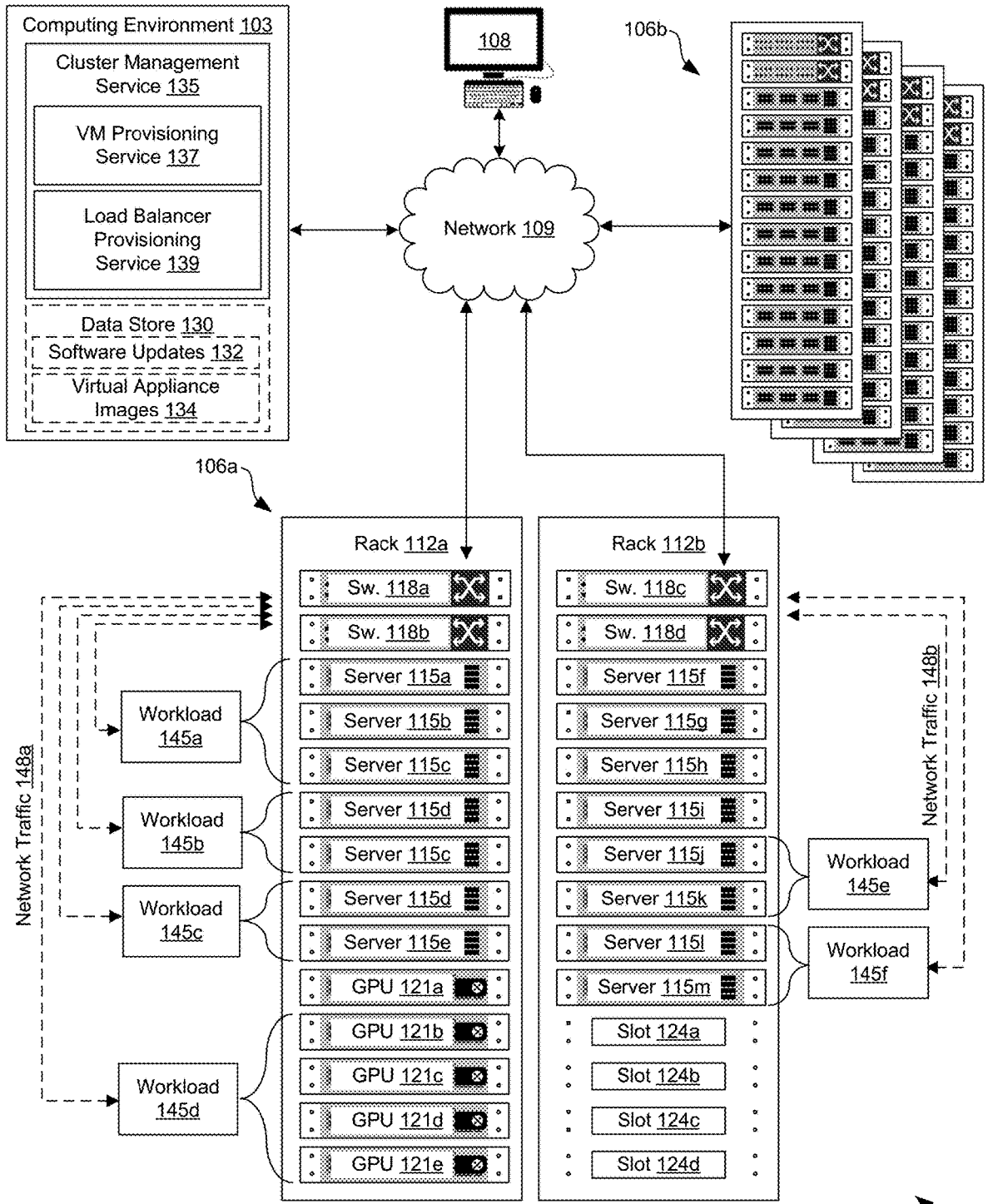
FIG. 1 is a drawing of an example of a virtualization environment having computing clusters capable of executing virtual appliances.

The present disclosure relates to performing software upgrades in high-availability (HA) computing clusters, and similar computing clusters, while minimizing or eradicating disruptions in service for end users. Various organizations are moving away from providing and maintaining purely physical desktops for personnel and, instead, are moving towards providing virtual desktop environments for employees to utilize. Some virtualization products deliver comprehensive end-user computing (EUC) capabilities. These virtualization products depend on a hypervisor or a virtual machine monitor (VMM) capable of managing computing resources for virtual machines, such as hardware resources. The automated management of physical resources can be critical to reduce the operational costs of virtualization environments.

Many virtualization environments include one or more virtual appliances, which are types of virtual machines generally consisting of a pre-configured operating system (OS) environment and a single application. In data centers that provide virtualization services, the software executing on virtual appliances and other types of virtual machines must be upgraded from time-to-time. For instance, new versions of applications often include fixes to increase efficiency of use of computing resources, fix security vulnerabilities, and provide additional features.

However, in many situations, problems arise when an upgrade path between different versions of an application do not exist, especially in context of a high-availability computing cluster. For example, assume a virtual appliance in a high-availability computing cluster includes vRealize Automation 7.4 by VMware® as an application on the virtual appliance, where vRealize Automation 7.4 is compatible with the SUSE Linux Enterprise Server 11 (SLES 11) operating system. Assuming a new version of vRealize Automation (e.g., version 7.5 or above) uses the Photon OS by VMware®, no upgrade path would exist between the different versions of vRealize Automation. In other words, it is not possible to upgrade the application on the virtual appliance having the SLES 11 operating system, because the new version of the application instead requires Photon OS. The virtual appliance is incompatible with the software update and, thus, the software update cannot be performed.

Various examples are described for performing software upgrades in high-availability computing clusters, and similar computing clusters, while providing minimal or no downtime (e.g., service disruptions) to end users. In one example, one or more computing devices can oversee operation of a data center and maintain one or more virtual appliances that provide web services, virtualized desktops, or other services. The one or more computing devices, through execution of program code, can be directed to identify virtual appliances that require software updates, such as when a new version of an application becomes available. Further, the one or more computing devices can determine that a software update is unable to be performed on a virtual appliance, for example, when a feature of the virtual appliance is incompatible with the software update. For instance, the one or more computing devices can determine that a software update is incompatible with a version of an operating system.

To perform the software update, the one or more computing devices can provision a second virtual appliance in the computing cluster where the second virtual appliance comprises up-to-date software. In some examples, the one or more computing devices can provision a load balancer to provide no downtime or service disruptions during a software update. Further, the one or more computing devices can form a software cluster that includes the first virtual appliance and the second virtual appliance, causing data to be synchronized between the first virtual appliance and the second virtual appliance. Thereafter, the computing devices can decommission the first virtual appliance from the computing cluster. An end user would experience minimal or zero service disruptions during the update process, even despite incompatibilities existing between different versions of applications. As such, the examples described herein are directed towards improvements in the operation of computing systems, such as those that provide virtualization services using high-availability computing clusters.

With reference to FIG. 1, an example of a networked environment 100 is shown. The networked environment 100 can include a computing environment 103 and various computing clusters 106a . . . 106b in communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks. As the networked environment 100 can serve up virtual desktops to end users, the networked environment 100 can also be described as a virtual desktop infrastructure (VDI) environment.

In various embodiments, the computing clusters 106 can include a plurality of devices installed in racks 112 which can make up a server bank, aggregate computing system, or a computer bank in a data center or other like facility. In some examples, the computing cluster can include a high-availability computing cluster. A high-availability computing cluster is a group of computing devices that act as a single system and provides a continuous uptime. The devices in the computing clusters 106 can include any number of physical machines, virtual machines, virtual appliances, and software, such as operating systems, drivers, hypervisors, scripts, and applications.

In some examples, a computing environment 103 can include an enterprise computing environment that includes hundreds or even thousands of physical machines, virtual machines, and other software implemented in devices stored in racks 112, distributed geographically and connected to one another through the network 109. It is understood that any virtual machine or virtual appliance is implemented using at least one physical device.

The devices in the racks 112 can include, for example, memory and storage devices, servers 115a . . . 115m, switches 118a . . . 118d, graphics cards (having one or more GPUs 121a . . . 121e installed thereon), central processing units (CPUs), power supplies, and similar devices. The devices, such as servers 115 and switches 118, can have dimensions suitable for quick installation in slots 124a . . . 124d on the racks 112. In various examples, the servers 115 can include requisite physical hardware and software to create and manage a virtualization infrastructure. The physical hardware for a server 115 can include a CPU, graphics card (having one or more GPUs 121), data bus, memory, and other components. In some examples, the servers 115 can include a pre-configured hyper-converged computing device where a hyper-converged computing device includes pre-tested, pre-configured, and pre-integrated storage, server and network components, including software, that are positioned in an enclosure installed in a slot 124 on a rack 112.

Additionally, if a server 115 includes an instance of a virtual machine, the server 115 can be referred to as a "host," while the virtual machine can be referred to as a "guest." Each server 115 that acts as a host in the networked environment 100, and thereby includes one or more guest virtual machines, can also include a hypervisor. In some examples, the hypervisor can be installed on a server 115 to support a virtual machine execution space within which one or more virtual machines can be concurrently instantiated and executed. In some examples, the hypervisor can include the VMware ESX™ hypervisor, the VMware ESXi™ hypervisor, or similar hypervisor. It is understood that the computing clusters 106 are scalable, meaning that the computing clusters 106 in the networked environment 100 can be scaled dynamically to include additional servers 115, switches 118, GPUs 121, power sources, and other components, without degrading performance of the virtualization environment. In some examples, the hosts in the computing cluster 106 are monitored and, in the event of a failure, the virtual machines or virtual appliances on a failed host are restarted on alternate hosts.

In various examples, when a host (e.g., a physical server) is added to a computing cluster 106, an agent application can be uploaded to the host and configured to communicate with other agent applications in the computing cluster 106. Some of the hosts in the computing cluster 106 can be designated as primary hosts, and other hosts in the computing cluster 106 can be designated as secondary hosts. The primary hosts, for example, can maintain and replicate states of the computing cluster 106 and can be used to initiate failover actions. Any host that joins the computing cluster 106 can communicate with a host, such as an existing primary host, to complete its configuration.

The computing environment 103 can include, for example, a server or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. Although shown separately from the computing clusters 106, it is understood that in some examples the computing clusters 106 can be a portion of the computing environment 103.

The computing environment 103 can include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing clusters 106 and client devices 108 for end users over the network 109, sometimes remotely, the computing environment 103 can be described as a remote computing environment 103 in some examples. Additionally, in some examples, the computing environment 103 can be implemented in servers 115 of a rack 112 and can manage operations of a virtualized computing environment. Hence, in some examples, the computing environment 103 can be referred to as a management cluster in the computing clusters 106.

The computing environment 103 can include a data store 130. The data store 130 can include memory of the computing environment 103, mass storage resources of the computing environment 103, or any other storage resources on which data can be stored by the computing environment 103. The data store 130 can include memory of the servers 115 in some examples. In some examples, the data store 130 can include one or more relational databases, such as structure query language (SQL) databases, non-SQL databases, or other relational or non-relational databases. The data stored in the data store 130, for example, can be associated with the operation of the various services or functional entities described below.

In some examples, the data store 130 can include a database or other memory that includes, for example, software updates 132 and virtual appliance images 134. Software updates 132 can include, for example, scripts, applications, code, or other software that upgrades an application from a first version to a second version, typically a version having a later release date. In some examples, the software updates 132 can roll back a version of an application to a previous version, for instance, when a new version of an application is determined as vulnerable or unstable. In additional examples, the software updates 132 can include the new version of the application, as opposed to an installer that merely upgrades a previous version of an application to a newer version.

Virtual appliance images 134 can include virtual machine images utilized by a cluster management service 135 in provisioning (or executing) a new virtual appliance ready to run on a hypervisor of a host in the computing cluster 106. The virtual appliance images 134 can eliminate the installation, configuration and maintenance costs associated with running complex configurations of software in the computing clusters 106. The virtual appliance images 134 can be configured to host a single application in some examples.

The components executed on the computing environment 103 can include, for example, a cluster management service 135 as well as other applications, services, processes, systems, engines, or functionality not discussed in detail herein. The cluster management service 135 can be executed to oversee the operation of the networked environment 100 through management of the computing clusters 106 as well as the devices and software that make up the computing clusters 106, such as virtual machines and virtual appliances. In some examples, an enterprise, organization, or other entity, can operate the cluster management service 135 to oversee or manage the operation of devices in the racks 112, such as servers 115, switches 118, GPUs 121, power supplies, cooling systems, and other components.

Additionally, through the cluster management service 135, information technology (IT) personnel or other administrators can operate virtual desktops in a data center capable of being delivered to and accessed by employees or other individuals as a managed service through client devices 108. Through the virtual desktops, end users can be provided with a familiar, personalized environment that they can access from any number of devices from any location while the administrators gain centralized control, efficiency, and security by having desktop data in the data center.

Further, in some examples, the cluster management service 135 can include a virtual machine provisioning service 137 as well as a load balancer provisioning service 139. The virtual machine provisioning service 137 can utilize virtual appliance images 134, or other images or configurations, to provision new virtual appliances (or other types of virtual machines). The load balancer provisioning service 139 can similarly provision load balancer applications or similar software to perform load balancing operations during software updates overseen by the cluster management service 135, as will be discussed.

Further, various physical and virtual components of the computing clusters 106 can process workloads 145a . . . 145f. Workloads 145 can refer to the amount of processing that a server 115, switch 118, GPU 121, or other physical or virtual component has been instructed to process or route at a given time. The workloads 145 can be associated with virtual machines or other software executing on the servers 115. For instance, the workloads 145 can include tasks to be processed to provide employees of an enterprise with remote desktop sessions or other virtualized computing sessions.

The cluster management service 135 can maintain a listing of active or inactive workloads 145 as well as oversee the assignment of various workloads 145 to various devices in the computing clusters 106. For instance, the cluster management service 135 can assign a workload 145 lacking in available resources to a server 115 that has resources sufficient to handle the workload 145. The workloads 145 can be routed to various servers 115 by the switches 118 as network traffic 148a . . . 148b. As can be appreciated, a disruption in the processing of workloads 145 causes a disruption in providing services to client devices 108 or other devices. For instance, a disruption on the processing of workloads 145 can prevent the ability to provide a virtual desktop session for a client device 108. According to the examples described herein, the cluster management service 135 can configure computing clusters 106 to include software updates 132 while minimally impacting, or not impacting, the processing of workloads 145 by the computing clusters 106.

Figure 2:
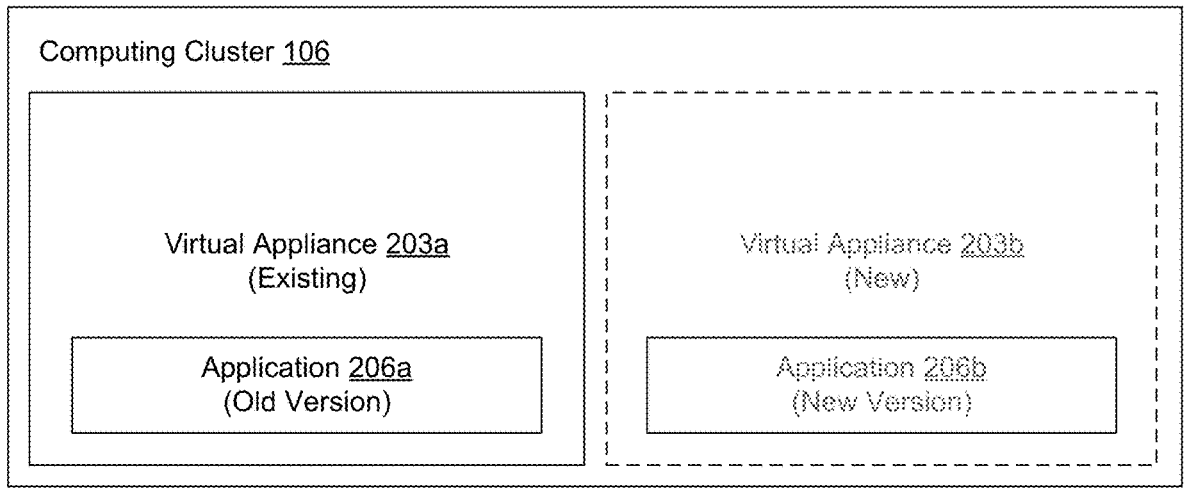
FIGS. 2-5 are drawings illustrating example computer architecture for provisioning a new virtual appliance in a computing cluster, for instance, to perform a software update.

Referring next to FIG. 2, a schematic diagram 200 of a computing cluster 106 is provided showing an example a virtual appliance 203a (also referred to as the "existing virtual appliance 203a" or "first virtual appliance 203a") residing on the computing cluster 106. The virtual appliance 203a can include an all-in-one approach to distributing software and all of its required dependencies, such as a libraries, auxiliary software, settings, and initial data. Often some or all of those software components of the virtual appliance 203a have to change to accommodate for bug fixes, performance improvements, new features, and so forth. However, the changes required for the virtual appliance 203a can cause a component to become incompatible with its older dependencies, data, configuration or installation, thereby preventing an in-place upgrade of the virtual appliance 203a existing on the computing cluster 106.

As such, the cluster management service 135 can provision another virtual appliance 203b (also referred to as the "new virtual appliance 203b" or "second virtual appliance 203b") in the computing cluster 106, where the new virtual appliance 203b includes up-to-date software or, in other words, an updated version of an application that cannot be installed on the existing virtual appliance 203a. For example, the computing cluster 106 can include a high-availability computing cluster and the virtual appliance 203a can include an application 206a installed thereon, where the application 206a is an older version of an application (or an application having an available or required software update 132). The cluster management service 135 can provision the new virtual appliance 203b to include a new or updated version of the application 206b.

Figure 3:
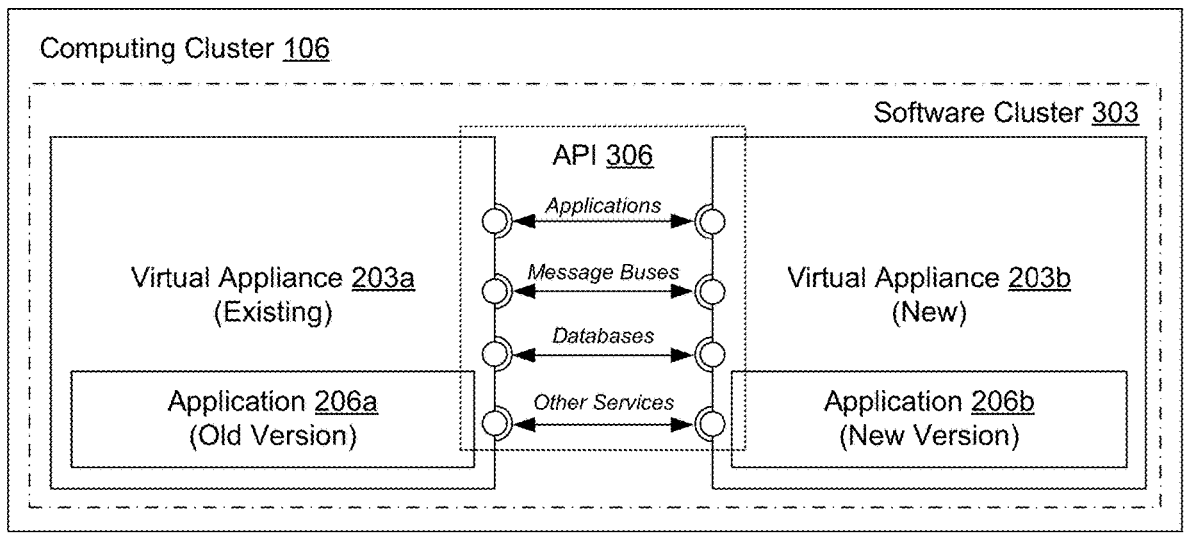

Turning now to FIG. 3, another schematic diagram 300 of the computing cluster 106 of FIG. 2 is provided showing the virtual appliances 203a, 203b residing on the computing cluster 106. After the cluster management service 135 has provisioned the new virtual appliance 203b, the cluster management service 135 can form a software cluster 303 that includes both the existing virtual appliance 203a and the new virtual appliance 203b. The software cluster 303 can include, for example, the existing virtual appliance 203a executing on a first server 115 and the new virtual appliance 203b executing on a second server 115 in some examples; however, the first server 115 and the second server 115 can act as a single computer system. Each of the servers 115 can maintain the same information and collectively perform administrative tasks such as load balancing, determining node failures, and assigning failover duty.

To form the software cluster 303, the cluster management service 135 can provide an application programming interface (API) 306 that causes the existing virtual appliance 203a and the new virtual appliance 203b to synchronize and share data. For instance, the API 306 can permit the old version of the application 206a and the new version of the application 206b to share application data by accessing common message buses, databases, or other services. In some examples, the new virtual appliance 203b can be configured substantially similar or identical to the existing virtual appliance 203a, to the extent permitted by the new version of the application 206b.

Figure 4:
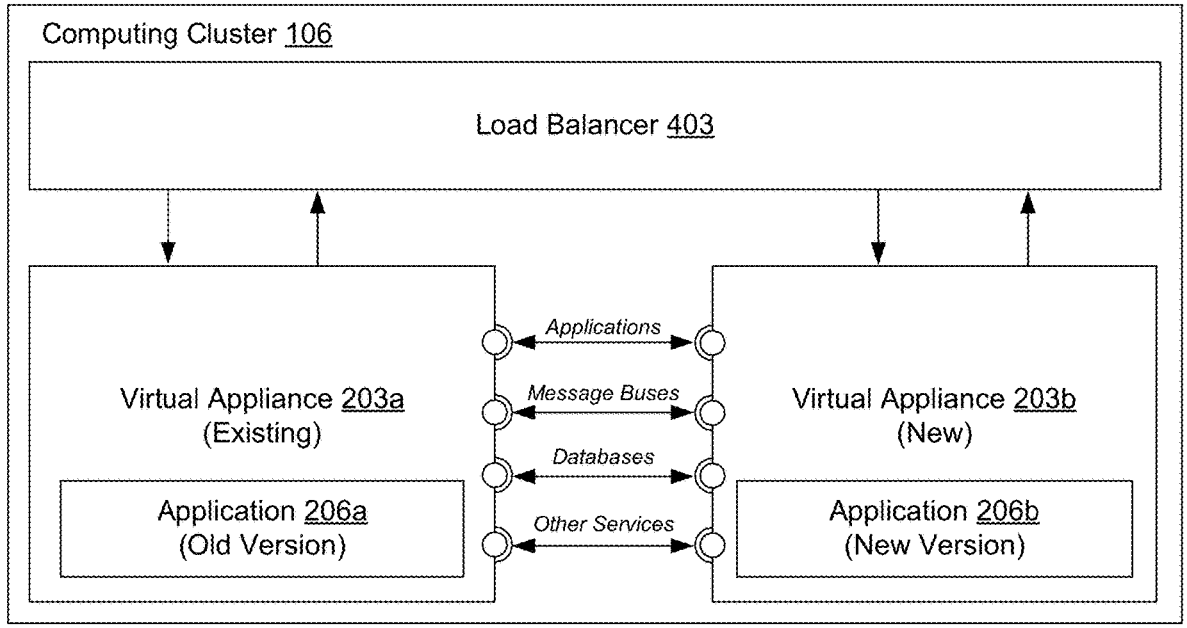

Moving on to FIG. 4, another schematic diagram 400 of the computing cluster 106 is provided showing the virtual appliances 203a, 203b residing on the computing cluster 106. In some examples, the cluster management service 135 can provision a load balancer 403, which includes an application or other service capable of performing load balancing operations between the existing virtual appliance 203a and the new virtual appliance 203b. By introducing the load balancer 403, the new virtual appliance 203b can begin processing workloads 145 once provisioned, sharing workload processing tasks with the existing virtual appliance 203a.

The load balancer 403 can optimize resource use, maximize throughput, minimize response time, and avoid overload of the existing virtual appliance 203a. Additionally, the load balancer 403 can increase reliability and redundancy in the computing cluster 106. In the event the existing virtual appliance 203a is providing a service actively used by an end user, such as a virtual desktop session, the load balancer 403 can prevent any service disruptions when the existing virtual appliance 203a is decommissioned, as will be discussed. For instance, the workload 145 can be introduced to the new virtual appliance 203b before the existing virtual appliance 203a (having the old version of the application 206a installed thereon) is terminated or otherwise removed from the computing cluster 106.

Figure 5:
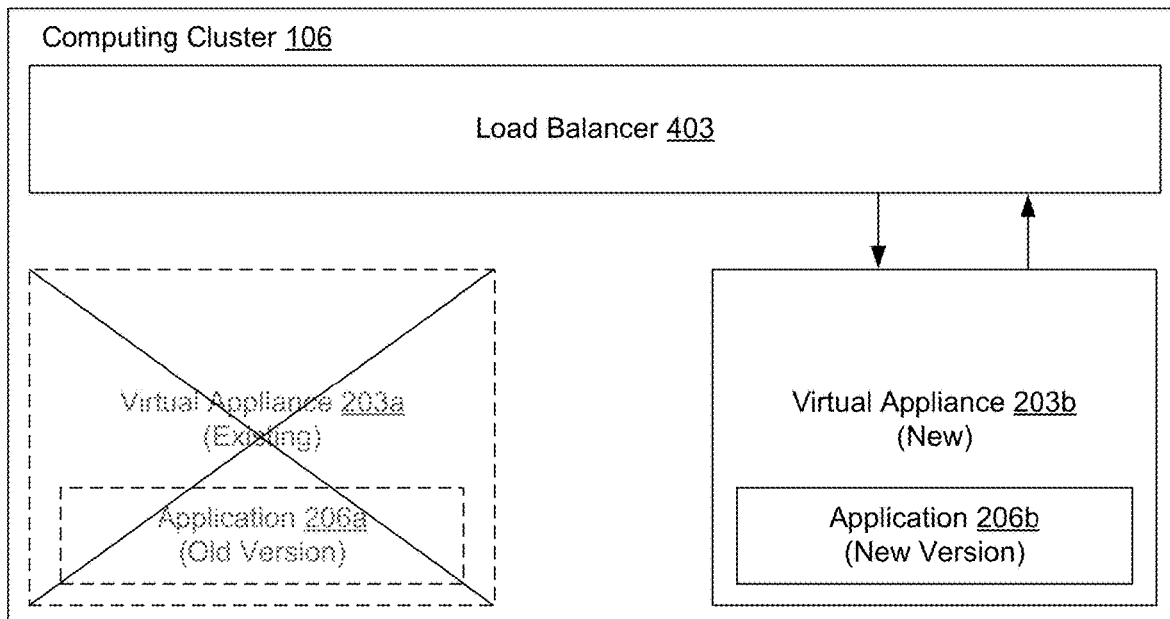

Referring now to FIG. 5, another schematic diagram 500 of the computing cluster 106 is provided showing the new virtual appliances 203b as the sole virtual appliance 203 in the computing cluster 106, for instance, after the existing virtual appliance 203a has been decommissioned. By decommissioning the existing virtual appliance 203a, it is understood that the virtual appliance 203a having the old version of the application 206a is no longer in use. As such, the computing cluster 106 only utilizes the new version of the application 206b. The cluster management service 135 can maintain the load balancer 403, for instance, if additional virtual appliances 203 are being used in the computing cluster 106 or, alternatively, can decommission the load balancer 403 after the existing virtual appliance 203a has been decommissioned. As the new virtual appliance 203b is operational, it is understood that it receives all of the workload 145, or shares the workload 145 with other virtual appliances 203 in the computing cluster 106.

Figure 6:
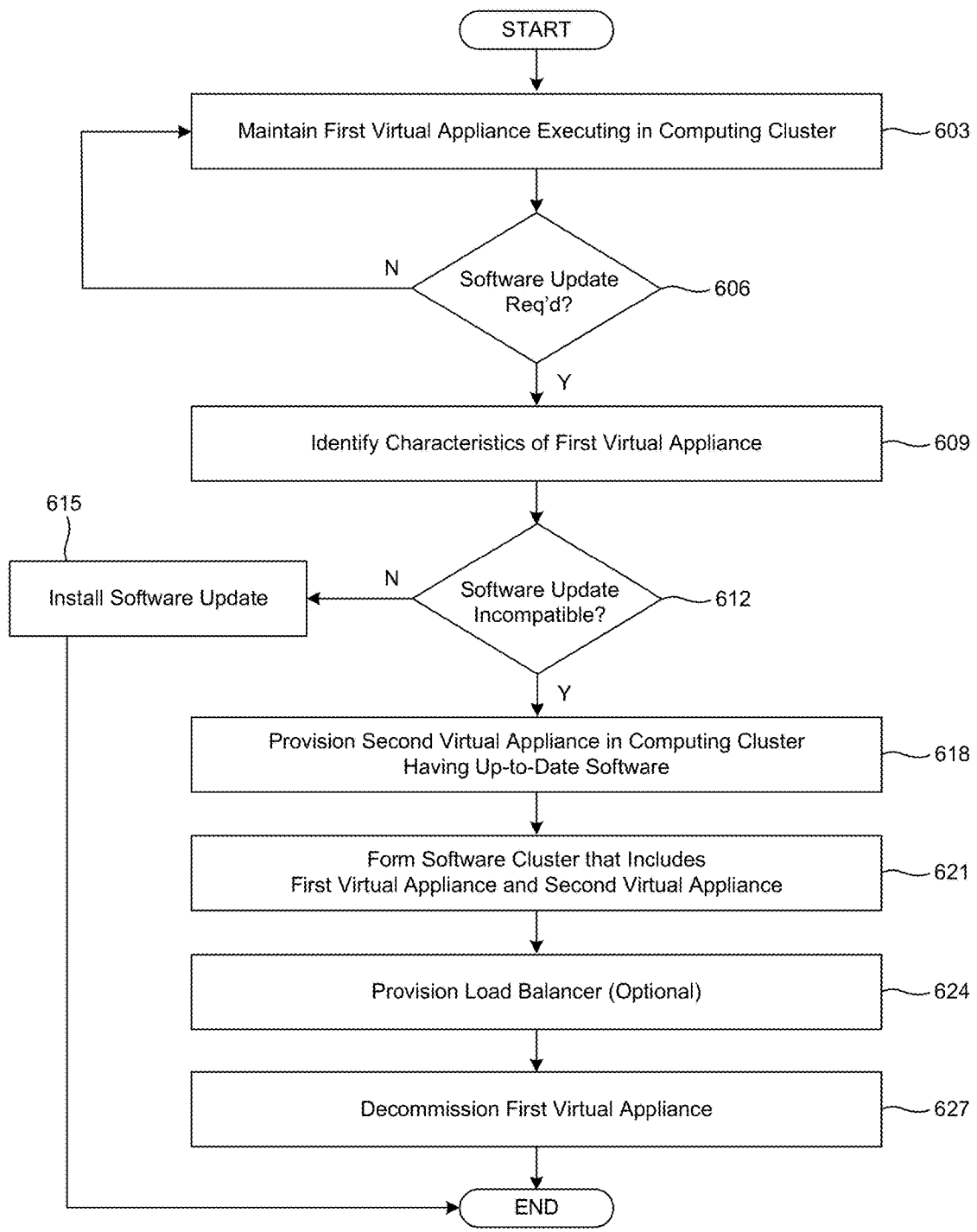
FIG. 6 is a flowchart illustrating functionality implemented by components of the virtualization environment of FIG. 1.

Moving on to FIG. 6, shown is a flowchart that provides one example of the operation of a portion of the networked environment 100. The flowchart of FIG. 6 can be viewed as depicting an example of elements of a method implemented by the cluster management service 135 or the virtual machine provisioning service 137 executing in the computing environment 103 according to one or more examples. The separation or segmentation of functionality as discussed herein is presented for illustrative purposes only.

Beginning with step 603, the computing environment 103 can maintain at least a first virtual appliance 203a executing in a computing cluster 106, where the computing cluster 106 can include a high-availability computing cluster in some examples. The first virtual appliance 203a can include the existing virtual appliance 203a, shown in FIG. 2. It is understood that the first virtual appliance 203a includes an application 206, such as an old version of an application 206a, also shown in FIG. 2. The first virtual appliance 203a can perform various functions associated with an operation of the virtualization environment. For instance, the first virtual appliance 203a can process workloads 145 to provide an end user of a client device 108 with a virtual desktop session. Alternatively, the first virtual appliance 203a can provide a web service or other virtualization services, as can be appreciated.

In step 606, the computing environment 103 can determine whether a software update 132 is available or required for the application 206a of the first virtual appliance 203a. For instance, a new version of an application can be released to fix bugs, improve performance or computational efficiency, provide new features, and so forth. The computing environment 103 can compare versions of applications 206 to determine that a version of an application 206 has a later release date, version number, or feature list. If a software update is not required, the process can revert back to step 603 to continue maintaining the first virtual appliance 203a in the computing cluster 106. Alternatively, if the computing environment 103 determines whether a software update 132 is available or required, the process can proceed to step 609.

In step 609, the computing environment 103 can identify various characteristics of the first virtual appliance 203a, for instance, to determine whether the software update 132 is compatible on the first virtual appliance 203a. The characteristics that can be identified can include, for example, an operating system of the first virtual appliance 203a, applications 206, drivers, scripts, or other software installed thereon, a version of the application 206 or other software installed thereon, as well as other information. In some examples, the characteristics of the host on which the first virtual appliance 203a can be identified as well.

Next, in step 612, the computing environment 103 can determine whether the software update 132 is incompatible with the first virtual appliance 203a, for instance, based on a comparison of requirements of a new version of the application 206b with the characteristics of the first virtual appliance 203a, identified in step 609. In one example, a new version of an application 206b may require a particular operating system, such as Photon OS. If the first virtual appliance 203a does not include Photon OS, the computing environment 103 can determine that the software update 132 is incompatible with the first virtual appliance 203a.

Alternatively, if the first virtual appliance 203a includes Photon OS, the computing environment 103 can determine that the software update 132 is compatible with the first virtual appliance 203a, as the process can proceed to step 615. For instance, in step 615, the computing environment 103 can cause the software update 132 to be installed or otherwise performed. Thereafter, the process can proceed to completion.

Referring back to step 612, if the software update 132 is incompatible with the first virtual appliance 203a, the process can proceed to step 615. In step 618, the computing environment 103 can provision a second virtual appliance 203b in the computing cluster 106, where the second virtual appliance 203b includes up-to-date software. In other words, the second virtual appliance 203b includes the new or updated version of the application 206b that was determined as incompatible with the existing virtual appliance 203a. Provisioning the new virtual appliance 203b can include, for instance, using a virtual appliance image 134 to install and configure the new virtual appliance 203b on a host of the computing cluster 106.

In step 321, the computing environment 103 can form a software cluster 303 that includes both the first virtual appliance 203a and the second virtual appliance 203b. The software cluster 303 can include, for example, the first virtual appliance 203a executing on a first server 115 and the second virtual appliance 203b executing on a second server 115; however, the first server 115 and the second server 115 act as a single computer system. To form the software cluster 303, the computing environment 103 can provide an API 306 that causes the first virtual appliance 203a and the second virtual appliance 203b to synchronize and share data. For instance, the API 306 can permit the old version of the application 206a and the new version of the application 206b to share application data by accessing common message buses, databases, or other services. In some examples, the new virtual appliance 203b can be configured substantially similar or identical to the existing virtual appliance 203a, to the extent permitted by the new version of the application 206b.

In step 624, the computing environment 103 can provision a load balancer 403 in the computing cluster 106 that balances a workload 145 between at least the first virtual appliance 203a and the second virtual appliance 203b, where the load balancer 403 includes an application or other service capable of performing load balancing operations between the first virtual appliance 203a and the second virtual appliance 203b. By introducing the load balancer 403, for instance, the second virtual appliance 203b can begin processing workloads 145 in conjunction with the first virtual appliance 203a.

In the event the existing virtual appliance 203a is providing a service actively used by an end user, such as a virtual desktop session, the load balancer 403 can prevent any service disruptions when the existing virtual appliance 203a is decommissioned. For instance, the workload 145 can be introduced to the second virtual appliance 203b before the first virtual appliance 203a (having the old version of the application 206a installed thereon) is terminated or decommissioned from the computing cluster 106.

Finally, in step 627, the computing environment 103 can decommission the first virtual appliance 203a in the computing cluster 106. In some examples, decommissioning the first virtual appliance 203a can include, for example, terminating execution of the first virtual appliance 203a or its application 206a. By decommissioning the first virtual appliance 203a, it is understood that the first virtual appliance 203a having the old version of the application 206a is no longer in use. As such, the computing cluster 106 only utilizes the new version of the application 206b. As the new virtual appliance 203b is operational, it is also understood that it receives all of the workload 145, or shares the workload 145 with other virtual appliances 203 in the computing cluster 106. In some examples, the computing environment 103 can maintain the load balancer 403, for instance, if additional virtual appliances 203 are being used in the computing cluster 106 or, alternatively, can decommission the load balancer 403 after the existing virtual appliance 203a has been decommissioned. Thereafter, the process can proceed to completion.

Figure 7:
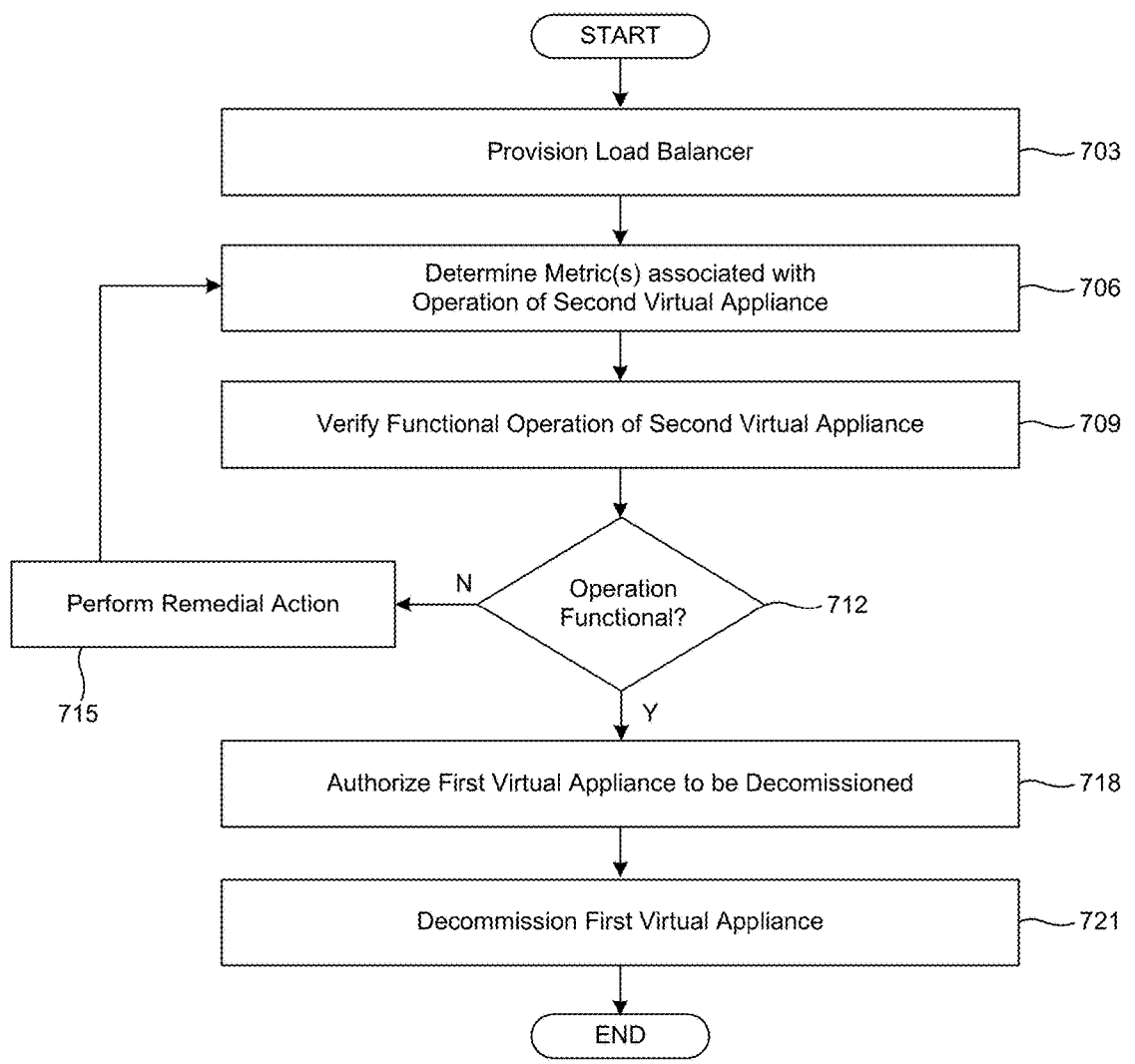
FIG. 7 is another flowchart illustrating functionality implemented by components of the virtualization environment of FIG. 1.

Turning now to FIG. 7, shown is a flowchart that provides one example of the operation of a portion of the networked environment 100. The flowchart of FIG. 7 can be viewed as depicting an example of elements of a method implemented by the cluster management service 135, the virtual machine provisioning service 137, or the load balancer provisioning service 139 executing in the computing environment 103 according to one or more examples. The separation or segmentation of functionality as discussed herein is presented for illustrative purposes only.

In step 703, the computing environment 103 can provision a load balancer 403 in the computing cluster 106 that balances a workload 145 between at least the first virtual appliance 203a and the second virtual appliance 203b, where the load balancer 403 includes an application or other service capable of performing load balancing operations between the first virtual appliance 203a and the second virtual appliance 203b. By introducing the load balancer 403, for instance, the second virtual appliance 203b can begin processing workloads 145 in conjunction with the first virtual appliance 203a.

Next, in step 706, the computing environment 103 can determine one or more metrics associated with an operation of the second virtual appliance 203b. For instance, prior to decommissioning the first virtual appliance 203a, the computing environment 103 can verify that the second virtual appliance 203b is operational. In some situations, a new version of an application 206b can cause a virtual appliance 203 to become operational. As such, metrics can be evaluated to determine whether the new version of the application 206b (or any configurations of the second virtual appliance 203b varying from the first virtual appliances 203a) is operating as intended. In some examples, the metrics can include CPU wait time, CPU contention, CPU idle time, host demand, demand over limit, demand over capacity, CPU time spent on system processes, CPU use, average active time of CPU, average peak time of CPU, as well as other metrics, as can be appreciated.

In step 709, the computing environment 103 can verify the functional operation of the second virtual appliance 203b, for instance, using the metrics determined in step 706. To this end, the computing environment 103 can compare a metric, such as CPU wait time, to a threshold metric indicative of whether the second virtual appliance 203b is operating given a distribution of the workload 145 between the first virtual appliance 203a and the second virtual appliance 203b (or other virtual appliance 203).

In step 712, the computing environment 103 can determine whether the operation of the second virtual appliance 203b is functional or, in other words, operating at a capacity suitable for providing virtualization services. If the operation of the second virtual appliance 203b is not functional, the process can proceed to step 715. In step 715, the computing environment 103 can perform a remedial action in response to an operation of the second virtual appliance 203b not being functional. Remedial actions can include, for instance, restarting the second virtual appliance 203b, decommissioning and recommissioning the second virtual appliance 203b, adjusting a configuration of the second virtual appliance 203b, adjusting access by the second virtual appliance 203b to computational resources, and so forth. Thereafter, the process can revert to step 706 to continue determining metrics.

Referring back to step 712, in the event that the second virtual appliance 203b is operational or, in other words, suitably operating, the process can proceed to step 718. In step 718, the computing environment 103 can authorize the first virtual appliance 203a to be decommissioned, as it has been determined that the provisioning and configuration of the second virtual appliance 203b has been successful.

Thereafter, in step 721, the computing environment 103 can decommission the first virtual appliance 203a in the computing cluster 106. In some examples, decommissioning the first virtual appliance 203a can include, for example, terminating execution of the first virtual appliance 203a or its application 206a. By decommissioning the first virtual appliance 203a, it is understood that the first virtual appliance 203a having the old version of the application 206a is no longer in use and any computing resources, such as hardware or software resources, are freed up and made available. At this stage, the computing cluster 106 only utilizes the new version of the application 206b. As the new virtual appliance 203b is operational, it is also understood that it receives all of the workload 145, or shares the workload 145 with other virtual appliances 203 in the computing cluster 106. Thereafter, the process can proceed to completion.

Stored in the memory device are both data and several components that are executable by the processor. Also stored in the memory can be a data store 130 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices 108 can be used to access user interfaces generated to configure or otherwise interact with the cluster management service 135. These client devices 108 can include a display upon which a user interface generated by a client application for providing a virtual desktop session (or other session) can be rendered. In some examples, the user interface can be generated using user interface data provided by the computing environment 103. The client device 108 can also include one or more input/output devices that can include, for example, a capacitive touchscreen or other type of touch input device, fingerprint reader, or keyboard.

Although the cluster management service 135 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for performing a software upgrade in a high-availability (HA) computing cluster without experiencing downtime, comprising:
    at least one computing device;
    program instructions stored in memory and executable in the at least one computing device that, when executed by the at least one computing device, directs the at least one computing device to:
        identify that a virtual appliance executing in the HA computing cluster requires a software update comprising an updated version of an application;
        determine that the software update is unable to be performed on the virtual appliance based at least in part on the virtual appliance comprising a first operating system that is incompatible with the software update based at least in part on the updated version of the application requiring a second operating system that is different from the first operating system, wherein there is no upgrade path for the updated version of the application based at least in part on the first operating system and the second operating system being different operating systems;
        in response to the virtual appliance being incompatible with the software update, provision an additional virtual appliance to replace the virtual appliance in the HA computing cluster, wherein the additional virtual appliance comprises up-to-date software;
        form a software cluster that comprises the virtual appliance and the additional virtual appliance, the software cluster causing data to be synchronized between the virtual appliance and the additional virtual appliance; and
        decommission the virtual appliance from the HA computing cluster.

2. The system of claim 1, wherein the at least one computing device is further directed to:
    provision a load balancer in the HA computing cluster that balances a workload between at least the virtual appliance and the additional virtual appliance;
    verify a functional operation of the additional virtual appliance prior to the virtual appliance being decommissioned using at least one metric associated with an operation of the additional virtual appliance; and
    in response to the functional operation being verified, authorize the virtual appliance to be decommissioned.

3. The system of claim 1, wherein the virtual appliance is incompatible with the software update in response to a software component or a virtual hardware component of the virtual appliance being incompatible with the software update.

4. The system of claim 1, wherein the at least one computing device is further directed to provide a communication interface in the HA computing cluster that has at least one application programming interface (API) that permits the data being communicated from the virtual appliance to the additional virtual appliance.

5. The system of claim 1, wherein the additional virtual appliance in the HA computing cluster is provisioned by installing the software update prior to the software cluster being formed that comprises the virtual appliance and the additional virtual appliance.

6. The system of claim 1, wherein the additional virtual appliance in the HA computing cluster is provisioned by installing an up-to-date version of a client application on the additional virtual appliance prior to the software cluster being formed that comprises the virtual appliance and the additional virtual appliance.

7. A non-transitory computer-readable medium for performing a software upgrade in a high-availability (HA) computing cluster without experiencing downtime, the non-transitory computer-readable medium comprising program code executable in at least one computing device that, when executed by the at least one computing device, directs the at least one computing device to:
    identify that a virtual appliance executing in the HA computing cluster requires a software update comprising an updated version of an application;
    determine that the software update is unable to be performed on the virtual appliance based at least in part on the virtual appliance comprising a first operating system that is incompatible with the software update based at least in part on the updated version of the application requiring a second operating system that is different from the first operating system, wherein there is no upgrade path for the updated version of the application based at least in part on the first operating system and the second operating system being different operating systems;
    in response to the virtual appliance being incompatible with the software update, provision an additional virtual appliance to replace the virtual appliance in the HA computing cluster, wherein the additional virtual appliance comprises up-to-date software;
    form a software cluster that comprises the virtual appliance and the additional virtual appliance, the software cluster causing data to be synchronized between the virtual appliance and the additional virtual appliance; and
    decommission the virtual appliance from the HA computing cluster.

8. The non-transitory computer-readable medium of claim 7, wherein the at least one computing device is further directed to:
    provision a load balancer in the HA computing cluster that balances a workload between at least the virtual appliance and the additional virtual appliance;
    verify a functional operation of the additional virtual appliance prior to the virtual appliance being decommissioned using at least one metric associated with an operation of the additional virtual appliance; and
    in response to the functional operation being verified, authorize the virtual appliance to be decommissioned.

9. The non-transitory computer-readable medium of claim 7, wherein the virtual appliance is incompatible with the software update in response to a software component or a virtual hardware component of the virtual appliance being incompatible with the software update.

10. The non-transitory computer-readable medium of claim 7, wherein the at least one computing device is further directed to provide a communication interface in the HA computing cluster that has at least one application programming interface (API) that permits the data being communicated from the virtual appliance to the additional virtual appliance.

11. The non-transitory computer-readable medium of claim 7, wherein the additional virtual appliance in the HA computing cluster is provisioned by installing the software update prior to the software cluster being formed that comprises the virtual appliance and the additional virtual appliance.

12. The non-transitory computer-readable medium of claim 7, wherein the additional virtual appliance in the HA computing cluster is provisioned by installing an up-to-date version of a client application on the additional virtual appliance prior to the software cluster being formed that comprises the virtual appliance and the additional virtual appliance.

13. A computer-implemented method for performing a software upgrade in a high-availability (HA) computing cluster without experiencing downtime, the method comprising:
  identifying that a virtual appliance executing in the HA computing cluster requires a software update comprising an updated version of an application;
  determining that the software update is unable to be performed on the virtual appliance based at least in part on the virtual appliance comprising a first operating system that is incompatible with the software update based at least in part on the updated version of the application requiring a second operating system that is different from the first operating system, wherein there is no upgrade path for the updated version of the application based at least in part on the first operating system and the second operating system being different operating systems;
  in response to the virtual appliance being incompatible with the software update, provisioning an additional virtual appliance to replace the virtual appliance in the HA computing cluster, wherein the additional virtual appliance comprises up-to-date software;
  forming a software cluster that comprises the virtual appliance and the additional virtual appliance, the software cluster causing data to be synchronized between the virtual appliance and the additional virtual appliance; and
  decommissioning the virtual appliance from the HA computing cluster.

14. The computer-implemented method of claim 13, further comprising:
  provisioning a load balancer in the HA computing cluster that balances a workload between at least the virtual appliance and the additional virtual appliance;
  verifying a functional operation of the additional virtual appliance prior to the virtual appliance being decommissioned using at least one metric associated with an operation of the additional virtual appliance; and
  in response to the functional operation being verified, authorizing the virtual appliance to be decommissioned.

15. The computer-implemented method of claim 13, wherein the virtual appliance is incompatible with the software update in response to a software component or a virtual hardware component of the virtual appliance being incompatible with the software update.

16. The computer-implemented method of claim 13, wherein the additional virtual appliance in the HA computing cluster is provisioned by installing the software update prior to the software cluster being formed that comprises the virtual appliance and the additional virtual appliance.

17. The computer-implemented method of claim 13, wherein the additional virtual appliance in the HA computing cluster is provisioned by installing an up-to-date version of a client application on the additional virtual appliance prior to the software cluster being formed that comprises the virtual appliance and the additional virtual appliance.

18. The computer-implemented method of claim 13, wherein the at least one computing device is further directed to provide a communication interface in the HA computing cluster that has at least one application programming interface (API).

19. The computer-implemented method of claim 18, wherein the API permits the data being communicated from the virtual appliance to the additional virtual appliance.

20. The computer-implemented method of claim 13, wherein the additional virtual appliance comprises the second operating system.

* * * * *